MINOR & WARD.
Carriage.

No. 69,012.

Patented Sept. 17, 1867.

Witnesses.
Theo Tusche
Wm Dean Overell

Inventors.
Jno H Minor
D P Ward
Per Munn & Co
Attorneys

United States Patent Office.

JOHN W. MINOR AND DAVID P. WARD, OF NEW BEDFORD, MASSACHUSETTS.

Letters Patent No. 69,012, dated September 17, 1867.

---

IMPROVEMENT IN THREE-WHEELED VEHICLE.

---

The Schedule referred to in these Letters Patent and making part of the same.

---

TO ALL WHOM IT MAY CONCERN:

Be it known that we, JOHN W. MINOR and DAVID P. WARD, of New Bedford, in the county of Bristol, and State of Massachusetts, have invented a new and useful Improvement in Three-Wheeled Vehicles; and we do hereby declare that the following is a full, clear, and exact description thereof, which will enable those skilled in the art to make and use the same, reference being had to the accompanying drawings forming part of this specification.

This invention relates to improvements in wheeled vehicles, and it has more particular reference to those vehicles which are used for the transportation of heavy burdens, as trucks or drays; and it consists in the peculiar arrangement of a third or guiding wheel to the forward end of the said vehicles, as will hereinafter be more fully described.

Similar letters of reference indicate corresponding parts.

Figure 1:
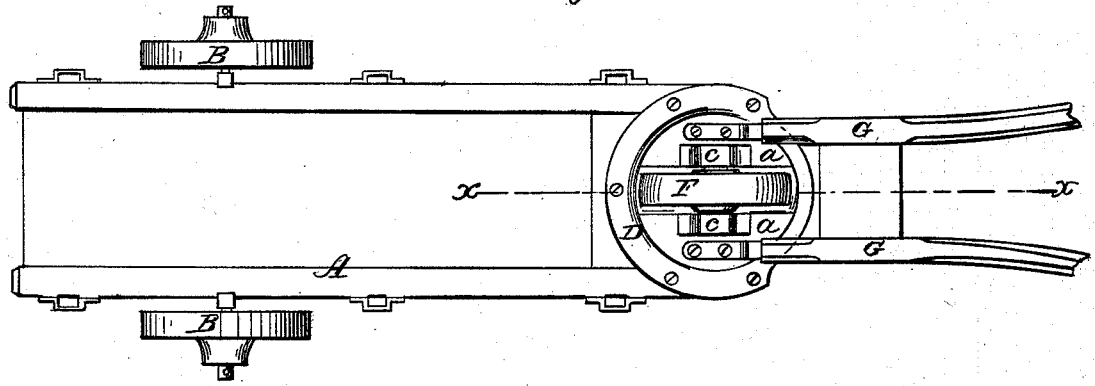
Figure 1 is a top or plan view of a vehicle with our improvement attached.
Figure 2:
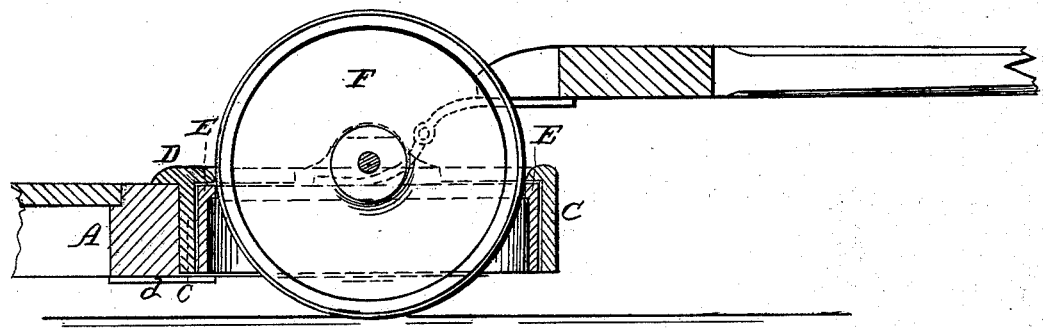
Figure 2 is a vertical longitudinal section of fig. 1, through the line $x\ x$, showing the third wheel, and the manner in which it is attached.

A represents the body of a dray, formed in the ordinary manner, with the axle and rear wheels attached as is usual with that class of vehicles. B represents the rear wheels. For the purpose of dropping the bottom of the dray as near the surface of the ground as may be desirable, and still retaining the wheels of suitable diameter, the axle may be bent or dropped down for the bottom of the dray to rest on, thereby facilitating the loading and unloading of the dray. Vehicles of this description must be so constructed that they may be turned round within a space not greater than their own length. In a four-wheeled or two-horse dray, this cannot be done without raising the body of the dray high enough for the forward wheels to pass under the bottom, which renders them inconvenient for loading heavy goods. To overcome this difficulty as regards this class of vehicles, is our object in the present invention, as well as to furnish a cheaper, safer, and more convenient vehicle for other purposes. To the forward end of the dray, or supported by the forward portion of the frame, we have a section of a hollow cylinder, C, with a broad flange on its upper edge or rim, which is marked D. The cylinder or flanged ring C is fastened to the frame or body of the dray by this flange, as seen in fig. 1. Within this section of a cylinder, C, there is another section of a cylinder marked E, with two plates on its upper edge, which extend inward toward the centre, marked $a\ a$. The space between these plates is occupied by a wheel marked F. $c\ c$ are the boxes on the plates $a\ a$, which support the gudgeons or arbor on which the wheel revolves. The two sections of cylinders C and E fit together, so that E is allowed to revolve freely within C. It is confined in C by stop plates on the bottom of the frame, (one of which is seen at $d$, fig. 2,) on which it may rest, and by the flange D on C, which projects inward, thus forming a lip which prevents it from rising. In this position, and confined in this manner, it, with the wheel F, is allowed to make an entire revolution if desired. G represents the shafts or thills, (where a single horse is used,) which are attached directly to the plates $a\ a$ of E, as seen in the drawing. It will of course be understood that a pole for two horses may be attached to the plates in a similar manner. It will be seen that by this arrangement, the team attached to this vehicle can turn in either direction, without any cramping, and without any danger of upsetting, and that the vehicle can be turned round in a space of its own length, while its body or bottom may be kept as near the surface of the ground as may be desired for facilitating the loading and unloading of heavy freight. The arbor of the wheel F may be connected with springs in such a manner that it will be relieved of any sudden jolt or concussion in passing over rough places, if desired.

We do not broadly claim the application of the third wheel to vehicles, as we are aware that they have been used before, but having thus described our invention, what we claim as new, and desire to secure by Letters Patent, is—

1. The sections of cylinders C and E, one revolving within the other, substantially as and for the purposes herein shown and described.

2. We claim the flange D projecting from the rim of the cylinder, for fastening on the outside, and forming a lip on its inner side, substantially as described.

3. We claim the wheel F attached to a three-wheeled vehicle, when the said wheel is attached to a horizontal section of a cylinder, which has free horizontal motion, substantially as described.

JOHN W. MINOR,
DAVID P. WARD.

Witnesses:
ATWOOD HOLMES,
CHAS. DE WOLF.